July 15, 1958 R. C. MOORE ET AL 2,843,826

MODULATOR SYSTEM

Filed May 21, 1953

INVENTORS
ROBERT C. MOORE
GEORGE L. CARSON

BY

ATTORNEY 2,843,826
Patented July 15, 1958

2,843,826

MODULATOR SYSTEM

Robert C. Moore, Erdenheim, and George L. Carson, Philadelphia, Pa., assignors to Philco Corporation, Philadelphia, Pa., a corporation of Pennsylvania Application May 21, 1953, Serial No. 356,516

9 Claims. (Cl. 332—44)

Figure 1:
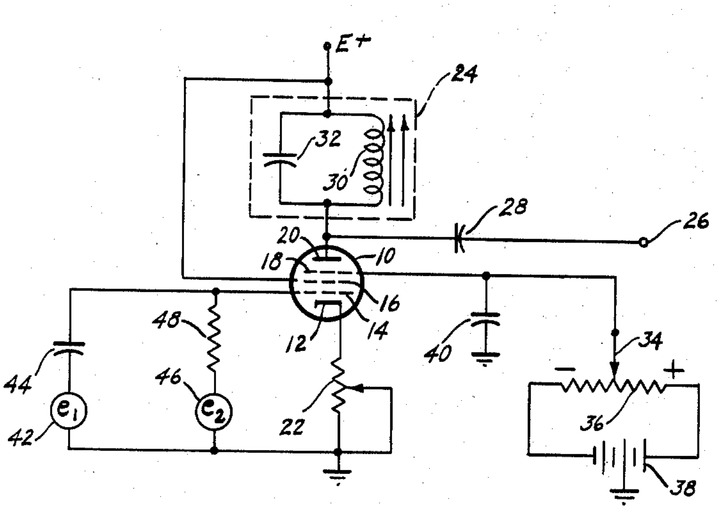

This invention relates to electrical systems adapted to produce an output signal as determined by the product of a plurality of input signals, and more particularly to balanced modulator systems. Such systems may be used for suppressed-carrier amplitude modulation of a first input signal by a second input signal and the invention will be specifically described in this connection. It should be well understood, however, that the systems of the invention are not limited to the above use, but are equally applicable to other uses such as producing an output signal having a phase, with respect to that of a first input signal to the system, as determined by the amplitude of a second input signal to the system.

Many types of balanced modulator systems have heretofore been proposed. Such systems generally comprise two, or multiples of two, non-linear elements—i. e., crystal rectifiers, thermionic diodes, triodes or the like—which are symmetrically arranged so that the output signal is reduced to zero for a zero value of the input modulation signal.

Because of the requirement for symmetry in such prior-art modulators, it has been necessary to match closely the characteristics of the corresponding components of the constituent branches of the modulator. Such matching may initially be achieved by a tedious comparison of the characteristics of a fairly large number of the elements, or by manufacturing the elements under very stringent tolerance requirements. In practice is is found, however, that the characteristics of the selected elements will change substantially and in divergent directions with use so that the balanced condition initially established is not maintained. In such cases, to reestablish the balanced condition, it is necessary to replace the non-linear elements, so that effectively their useful life is considerably shorter than the time required for their structural failure.

It is accordingly an object of the invention to provide a novel electrical system adapted to produce an output signal as determined by the product of a plurality of input signals.

Another object of the invention is to provide a balanced modulator which is inexpensive and reliable.

A further object of the invention is to provide a balanced modulator which obviates the need for paired components arranged in a symmetrical network.

An additional object of the invention is to provide a balanced modulator which does not require expensive matched sets of non-linear elements for satisfactory operation.

Yet another object of the invention is to provide a balanced modulator utilizing a single non-linear circuit element.

A still further object of the invention is to provide a balanced modulator requiring only a single non-linear element and having superior long-time stability compared with balanced modulators requiring a plurality of non-linear elements.

In accordance with the invention, the foregoing objects are achieved by an electrical system comprising a single transfer element which is made to exhibit the required non-linear transfer characteristic by appropriately establishing the operating parameters of the element. More specifically, and in accordance with the preferred embodiment of the invention, the foregoing objects are achieved by a balanced modulator system comprising an electron discharge tube having first, second and third control electrodes arranged serially in the electron path between a cathode and an anode. The multi-electrode tube is made to exhibit a non-linear transfer characteristic of anode current vs. potential of the first control electrode, which characteristic has a positive slope for a first range of values of this potential, a zero slope for a given value of this potential, and a negative slope for a second range of values of this potential. The aforesaid given value of the potential of the first control electrode is determined by the value of a resistive element connecting the cathode to a point at reference potential, and by the values of D.-C. potentials applied to the second and third control electrodes and to the anode of the tube, as is indicated more fully hereinafter.

The system additionally comprises a source of a first input wave having an average amplitude and having variations about the average amplitude recurring at a first nominal frequency, a source of a second input wave, means for applying the first input wave to the first control electrode at a given average amplitude substantially equal to the aforesaid given value at the potential of the first control electrode and means for applying the second input wave to the first control electrode. As a further feature of the invention, there is included, in the anode circuit of the tube, a transmission path adapted to pass signals having a second nominal frequency substantially equal to a given odd-integer multiple of the first nominal frequency, and to attenuate signals having frequencies other than the second nominal frequency. In the specific embodiment of the invention described herein, the odd integer multiplier is chosen to be one.

Figure 2:
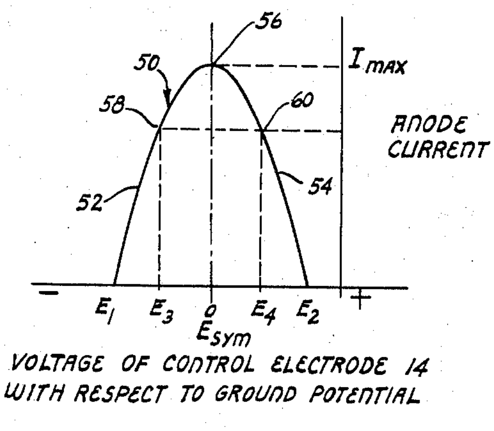

The invention will be described in greater detail with reference to the appended drawings forming part of the specification, and in which:

Figure 1 is a schematic diagram of the preferred embodiment of the invention; and Figure 2 is a graph illustrating a non-linear transfer characteristic of the system of Figure 1.

The balanced modulator system shown in Figure 1 comprises an electron discharge tube 10 having a cathode 12, a control electrode 14, a screen electrode 16, a suppressor electrode 18 and an anode 20.

The cathode 12 of tube 10 is coupled to a point at ground potential by a resistor 22 which, as shown, may be a variable resistor, while the anode 20 is coupled to a source of positive voltage at E+ by an electrical network 24, and to an output terminal 26 by a blocking capacitor 28. The network 24 is designed to be parallel-resonant at a frequency to be specified hereinafter and may comprise an inductor 30 and a capacitor 32 connected in shunt relationship. The inductor 30 may have a variable ferromagnetic core while the capacitor 32 may be constituted wholly or in part of the distributed capacitance of the inductor 30.

The screen electrode 16 of tube 10 is coupled to a source of positive voltage and, in the preferred arrangement shown in Figure 1, is coupled to the source E+. The suppressor electrode 18, on the other hand, is supplied with a fixed D.-C. voltage negative with respect to the voltage of screen electrode 16. The value of the voltage applied to suppressor electrode 18 is determined by the setting of the variable arm 34 of a potentiometer 36 shunting a voltage source shown as a battery 38, which battery has a tap thereof connected to a point at ground potential. In addition, the suppressor electrode 18 is A.-C. coupled to a point at ground potential by a bypass capacitor 40.

The control electrode 14 is coupled to a first signal source 42 through a capacitor 44, and to a second signal source 46 through a resistor 48. The signal waves generated by sources 42 and 46 respectively are described below.

In the preferred form of the invention, the tube 10 is chosen to have a screen electrode 16 which provides good electrostatic shielding of the suppressor electrode 18 and the anode 20 from the cathode 12 and the control electrode 14, and which is capable of dissipating a substantial amount of power. Tube 10 is additionally chosen to have a suppressor electrode 18 which exercises considerable control over the anode current of the tube. A tube having these desirable characteristics is, for example, a type 6AS6 pentode.

By reason of the connections shown, the tube 10 is made to exhibit a transfer characteristic, of anode current vs. the voltage of control electrode 16, of the form shown in Figure 2. More particularly, because of the electrostatic shielding provided by the screen electrode 16, the cathode current of tube 10 is primarily determined by the potential differences of the control electrode 14 and the screen electrode 16 with respect to the cathode 12, and is little affected by the potentials of the suppressor electrode 18 and the anode 20. On the other hand, the division of the cathode current between the screen electrode 16 and the anode 20, which division determines the form of the aforementioned transfer characteristic, is determined by the geometry of the tube 10 and by the values of the potentials of the screen electrode 16, the suppressor electrode 18 and the anode 20 with respect to the cathode 12. Otherwise stated, whether a given cathode-emitted electron, which is not intercepted by the control electrode, screen electrode or suppressor electrode structures, will be collected at the anode 20 or at the screen electrode 16, depends fundamentally on whether the kinetic energy imparted to the electron during its acceleration from the cathode 12 to the screen electrode 16 is greater than or less than the work which the electron must do against the retarding electric field established between the screen electrode 16 and the suppressor electrode 18. Since the potential difference between the screen electrode 16 and the suppressor electrode 18 is fixed—i. e. the retarding electric field therebetween has a substantially constant magnitude—a determining factor as to whether or not an electron will reach the anode 20 is therefore the potential difference between the suppressor electrode 18 and the cathode 12.

Thus, when the potential of control electrode 14 is only slightly more positive than the value $E_1$, a small cathode current flows in tube 10. At this time the voltage drop across resistor 22 is small and the potential of screen electrode 16 is relatively high with respect to the cathode 12. Because of the relatively large potential difference between the screen electrode 16 and the cathode 12, many of the cathode-emitted electrons are given sufficiently high kinetic energies (i. e., sufficiently high velocities) to overcome the retarding electric field existing between the suppressor electrode 18 and the screen electrode 16, so that many of them are collected at the anode 20 of the tube. Consequently a major portion of the cathode current flows to the anode 20, only a minor portion thereof being diverted to the screen electrode 16.

When the potential of control electrode 14 is made still more positive, the cathode current of tube 10 increases, tending thereby to increase the anode current. Concurrently, however, the voltage drop across cathode resistor 22 increases, and the potential difference between the screen electrode 16 and the cathode 12 decreases, thereby decreasing the velocities of the cathode-emitted electrons. Because of the diminished velocities of the electrons, the electric field between the suppressor electrode 18 and the screen electrode 16 becomes effective to repel a larger fraction of the electrons toward the screen electrode 16, permitting only a smaller fraction of the total number of the emitted electrons to reach the anode 20. This action continues until the value of the potential of control electrode 14 is equal to $E_{sym}$, at which time the velocities of the emitted electrons are reduced to an extent such that further small positive increases in the potential of the control electrode 14 do not increase the anode current. Thus, when the potential of control electrode 14 equals $E_{sym}$, the slope of the transfer characteristic becomes zero and the anode current attains its maximum value, designated as $I_{max}$ in Figure 2.

Further positive-going increases of the potential of the control electrode 14 increase the cathode current by a proportionate amount. However, because of the voltage drop across cathode resistor 22, the screen electrode 16 now has such a low potential with respect to the cathode 12 that the electric field between screen electrode 16 and suppressor electrode 18 diverts a greater number of electrons to the screen electrode 16 than are involved in the aforesaid proportionate increase in cathode current. Consequently the anode current now begins to fall and becomes increasingly smaller with increasingly positive control-electrode potential until this potential attains a value $E_2$. At this time the cathode-screen electrode potential, and correspondingly the velocities of the cathode-emitted electrons, are reduced to such small values that the electric field between screen electrode 16 and suppressor electrode 18 repels to the screen electrode 16 substantially all of the electrons flowing from the cathode 12, effecting thereby a substantially complete cut-off of the anode current. More positive values of the potential of control electrode 14 serve only to augment the current to the screen electrode 16.

It can be shown that the transfer characteristic at 50 is of substantially parabolic form, and that the ordinate $E_{sym}$ is the axis of symmetry of the parabola. This axis divides the transfer characteristic 50 into a branch 52 having a positive slope and a branch 54 having a negative slope. The point of zero slope, at which, as aforementioned, the anode current is $I_{max}$ and the voltage of control electrode 14 of tube 10 is $E_{sym}$, is indicated at 56.

When signal source 42 supplies to the control electrode 14 a first input wave having a given frequency and an axis of symmetry coincident with $E_{sym}$, e. g., a sinusoidal wave, and when signal source 46 has zero signal output, the anode current of tube 10 is varied symmetrically and periodically in response to the first input wave at a repetition rate equal to twice the given frequency. The anode current therefore comprises time-varying components, the slowest of which has a frequency equal to twice the given frequency of the first input wave. The other time-varying components have frequencies which are integer multiples of twice the given frequency. As a feature of the invention, the parallel-resonant circuit 24 is tuned to the given frequency of the first input wave. Consequently, the circuit 24 presents only a low impedance to those current components not having the given frequency, and thus, under these conditions, substantially no output signal appears at output terminal 26.

On the other hand, when the signal source 46 generates a second input signal having a non-zero value, e. g. a value $E_3$ (see Figure 2), the axis of symmetry of the first input signal is shifted to the value $E_3$, i. e., to the point 58 of the transfer characteristic 50, and therefore, the first input signal produces variations of the anode current having values dependent on the phase as well as the magnitude of that signal. The latter anode current variations therefore comprise a component which varies at the given frequency of the first input signal, has an amplitude proportional to the absolute amount of the displacement $|E_3-E_{sym}|$ of the axis of symmetry of the first input wave from the axis of symmetry of the transfer characteristic 50, and is substantially in phase with the first input signal. These anode current variations produce an output signal at terminal 26 substantially in phase opposition with the first input signal.

When the second input signal has a value $E_4$ such that $|E_4-E_{sym}|=|E_3-E_{sym}|$, the anode current component having the frequency of the first input signal has substantially the same amplitude as the corresponding anode current component produced when the second input signal has the value $E_3$, but is substantially in phase opposition therewith and with the first input signal. In this instance, therefore, the output signal at terminal 26 is substantially in phase with the input signal from source 42.

In balanced modulator systems, the second input signal, i. e., the modulating signal from source 46, generally exhibits continuous variations in accordance with intelligence, so that the output signal derived at terminal 26 is a suppressed carrier signal, the sidebands of which have amplitudes and frequencies as determined by the amplitude and frequency of the modulating signal.

Alternatively the system of the invention may equally well be used as a so-called phase reverser by supplying an input signal from the source 46, which signal undergoes rapid amplitude transitions about its reference level, e. g., a rectangular wave which is symmetrical about $E_{sym}$. Under these conditions, the output signal at terminal 26 will be phase-coincident with the first input signal when the polarity of the rectangular wave is positive with respect to $E_{sym}$, and will be phase-reversed when the polarity of the rectangular wave is negative with respect to $E_{sym}$.

While source 42 has been specifically described as a generator of a sinusoidal first input signal, it should be well understood that source 42 may, in general, be a generator of a first input signal which is a periodic wave having a given average value and varying about the said average value at a nominal frequency. Such waves, as is well known in the art, are analyzable into an infinite series of Fourier components which include the aforesaid given average value and an infinite number of sinusoidal wave components, each of which sinusoidal components has a frequency equal to the given nominal frequency or an integer multiple thereof. When such a first input signal is applied to the control electrode 14 of tube 10 in a manner such that the average value thereof coincides with $E_{sym}$, and when source 46 supplies a second input signal to the control electrode 14, each sinusoidal component of the latter first input signal undergoes modulation in accordance with the amplitude and polarity of the second input signal, as aforedescribed. Those sinussoidal components of the first input signal having frequencies equal to even-integer multiples of the nominal frequency, however, normally produce an output wave contaminated by an unmodulated wave of the same frequency generated in response to another sinusoidal component having half the frequency of the given sinusoidal component. On the other hand, those sinusoidal components of the first input signal, having frequencies which are odd-integer multiples of the aforesaid nominal frequency, produce output waves uncontaminated by such spurious unmodulated waves. Consequently circuit 24 may in general be tuned to a given odd-integer multiple of the nominal frequency of the first input wave, thereby to derive at terminal 26 an output wave having a nominal frequency equal to the given odd-integer multiple of the nominal frequency and an amplitude dependent on the value of the second input signal supplied by the source 46. The phase of the output wave at terminal 26 with respect to the first input signal is dependent on the polarity of the second input signal, and on the phase of the given sinusoidal component of the first input signal with respect to that signal.

The values of the circuit parameters necessary to impart to the modulation system the characteristics above described may be readily calculated from the published characteristics of the tube 10 and, in a typical case, may be as follows:

| | |
|---|---|
| Signal from source **42** | a sinusoid having a frequency of 3.58 mc./sec. and an amplitude of 1.0 volt peak-to-peak. |
| Signal from source **46** | a sinusoid having a frequency of 60 cycles/sec. and an amplitude of 0.7 volt peak-to-peak. |
| Tube **10** | Type 6AS6. |
| Capacitor **28** | 330 micromicrofarads. |
| Capacitor **32** | 68 micromicrofarads. |
| Capacitor **40** | 10 microfarads. |
| Capacitor **44** | 560 micromicrofarads. |
| Inductor **30** | variable from 10 to 22 microhenries. |
| Resistor **22** | approximately 390 ohms, adjustable. |
| Potentiometer **36** | 100,000 ohms. |
| Resistor **48** | 100,000 ohms. |
| Source **38** | 9 volts; 4.5 volt tap connected to a point at ground potential. The voltage applied to control electrode **18** may have a value of approximately −2.1 volts. |
| Source E+ | +275 volts. |

In practice it is preferable to adjust the system under operating conditions, thereby to establish accurately the values of resistor 22 and the D.-C. potential of suppressor electrode 18 as a function of the anode and screen electrode potentials of the tube. This adjustment may be made as follows:

The signal from source 46 is reduced to zero and the carrier wave generated by source 42 is applied to control electrode 14. The electrical network 24 is then tuned to the frequency of the carrier wave, or to an odd-integer multiple thereof as may be appropriate, by varying the position of the ferromagnetic tuning slug of inductor 30 to produce maximum amplitude of an output wave having the desired frequency. The settings of variable resistor 22 and of movable arm 34 on potentiometer 36 are then varied until no output signal at the given frequency is detectable at terminal 26. This null in the amplitude of the output signal indicates that the axis of symmetry of the sinusoidal wave is substantially coincident with $E_{sym}$. The signal from source 46 may now be restored to the system and the system will operate as aforedescribed.

From the foregoing, it will be seen that the system of the invention provides a balanced modulator comprising a single non-linear element. The system is simple, inexpensive, requires no matching of non-linear elements nor frequent replacement thereof, and is easy to adjust to proper operating conditions.

While we have described our invention by means of specific examples and in a specific embodiment, we do not wish to be limited thereto, for obvious modifications will occur to those skilled in the art without departing from the spirit and scope of the invention.

What we claim is:

1. An electrical system comprising a source of a sinusoidal input wave having a given amplitude and a preassigned frequency, a source of a second input wave, non-linear circuit means comprising a single pair of input terminals and a pair of output terminals and having a substantially parabolic transfer characteristic between said input and output terminals exhibiting a positive slope for a first range of values of an input signal, a zero slope for a given value of the said input signal and a negative slope for a second range of values of the said input signal, means for applying the said sinusoidal input wave to said pair of input terminals of said non-linear means at a given average amplitude substantially equal to the said given value of the said input signal, means for applying the said second input wave to said pair of input terminals of said non-linear circuit means, an electrical network parallel-resonant at the said preassigned frequency and coupled to the output of the said non-linear circuit means, and means for deriving from the said electrical network an output wave having a nominal frequency substantially equal to the said preassigned frequency.

2. A balanced modulator system comprising means for producing a first input wave having an average amplitude and having variations about the said average amplitude, the said variations recurring at a nominal frequency, means for producing a second input wave, non-linear circuit means comprising an electron discharge tube having a cathode, an anode and first, second and third control electrodes arranged serially in the electron path between the said cathode and anode, a resistive element coupling the said cathode to a point at reference voltage, means for coupling the said second control electrode to a source of positive voltage, means for coupling the said third control electrode to a source of direct voltage having a value less than the said positive voltage, means for coupling the said anode to a source of positive voltage, the said resistive element and the said voltages applied to the said second control electrode, third control electrode and anode having values such that the said electron discharge tube exhibits a transfer characteristic, between the value of the anode current and the value of an input signal applied to the said first control electrode, having a positive slope for a first range of values of the said input signal, a zero slope for a given value of the said input signal equal to said average amplitude and a negative slope for a second range of values of the said input signal, means for coupling the said means for producing the said first input wave to the said first control electrode, means for coupling the said means for producing the said second input wave to the said first control electrode, transmission means coupled to the anode of the said electron discharge tube, the said transmission means having a transmission characteristic adapted to pass signals having frequencies substantially equal to a given odd-integer multiple of the said nominal frequency and to substantially attenuate signals having frequencies other than substantially the said given odd-integer multiple of the said nominal frequency, and means for deriving from the said transmission means an output wave having a nominal frequency susbtantially equal to the said given odd-integer multiple of the said nominal frequency of the said first input wave.

3. An electrical system comprising means for producing a first input wave having an average amplitude and having variations about said average amplitude, said variations recurring at a nominal frequency, means for producing a second input wave, non-linear circuit means, including a single pair of input terminals and a pair of output terminals and exhibiting a transfer characteristic between said input and output terminals having a positive slope for a first range of values of an input signal, a zero slope for a given value of said input signal and a negative slope for a second range of values of said input signal, means for applying said first input wave to said pair of input terminals of said non-linear circuit means at a given average amplitude substantially equal to said given value of said input signal, means for applying said second input wave to said pair of input terminals of said non-linear circuit means, said transmission means having a transmission characteristic adapted to pass signals having frequencies substantially equal to a given odd-integer multiple of said nominal frequency and to attenuate signals having frequencies other than susbtantially said given odd-integer multiple of said nominal frequency, and means for deriving from said transmission means an output wave having a nominal frequency substantially equal to said given odd-integer multiple of said nominal frequency of said first input wave.

4. An electrical system according to claim 3, wherein said means for producing said first input wave comprise a source of a sinusoidal wave having said nominal frequency, said means for producing said second input wave comprise a source of a rectangular wave, and said transmission means comprise means for transmitting signals having a frequency substantially equal to said nominal frequency and for attenuating signals having frequencies differing substantially from said nominal frequency.

5. An electrical system comprising means for producing a first input wave having an average amplitude and having variations about said average amplitude, said variations recurring at a nominal frequency, means for producing a second input wave, non-linear circuit means comprising a single pair of input terminals and a pair of output terminals and having a transfer characteristic between said input and output terminals exhibiting first and second portions joined at a given point, said first and second portions corresponding respectively to first and second ranges of values of an output signal produced by said non-linear circuit means respectively in response to first and second ranges of values of an input signal, and said given point corresponding to a given value of said output signal produced in response to a given value of said input signal common to said first and second ranges of said input signal, said transfer characteristic having a zero slope at said given point and said first and second portions of said characteristic having respectively a positive and a negative slope and being symmetrical with respect to an axis defined by said given value of said input signal and passing through said given point, means for applying said first input wave to said pair of input terminals of said non-linear circuit means at a given average amplitude substantially equal to said given value of said input signal, means for applying said second input wave to said pair of input terminals of said non-linear circuit means, transmission means coupled to said output terminals of said non-linear circuit means, said transmission means having a transmission characteristic adapted to pass signals having frequencies substantially equal to a given odd-integer multiple of said nominal frequency and to attenuate signals having frequencies other than substantially said given odd-integer multiple of said nominal frequency, and means for deriving from said transmission means an output wave having a nominal frequency substantially equal to said given odd-integer multiple of said nominal frequency of said first input wave.

6. An electrical system according to claim 5 wherein said transmission means comprises an electrical network having a parallel resonance at said odd-integer multiple of said nominal frequency.

7. An electrical system according to claim 5, wherein said means for producing said first input wave comprise a source of a sinusoidal wave having said nominal frequency, said means for producing said second input wave comprise a source of a wave undergoing variations in accordance with intelligence, and said transmission means comprise means for transmitting signals having a frequency susbtantially equal to said nominal frequency and for attenuating signals having frequencies differing substantially from said nominal frequency.

8. A balanced modulator system comprising means for producing a carrier voltage wave having an average value and having periodic amplitude variations recurring about said average value at a nominal frequency, means for producing a second voltage wave, an electron discharge tube comprising a cathode, an anode, and first, second and third control electrodes arranged serially between said cathode and anode, said first control electrode being arranged adjacent said cathode, said third control electrode being arranged adjacent said anode, and said second control electrode being arranged adjacent and intermediate said first and second control electrodes, a resistive element connecting said cathode to a point at reference potential, a tuned circuit comprising an inductor and a capacitor connected in shunt relationship, said inductor and capacitor having values such that said tuned circuit is resonant at a predetermined odd-integer multiple of said nominal frequency, means connecting said resistive element and said tuned circuit in series relationship with the cathode-anode path of said tube for signals having a frequency equal to said predetermined odd-integer multiple, means supplying to said second control electrode a substantially constant potential positive with respect to said reference potential, means supplying to said anode a potential positive with respect to said reference potential, means supplying to said third control electrode a potential substantially less positive than either one of said potentials supplied respectively to said second control electrode and said anode, said resistive element and said voltages applied to said anode and said three control electrodes having respective values such that the transfer characteristic defining the dependence of the anode current of said tube upon the potential difference between said first control electrode and said point at reference potential is substantially parabolic in form, having a positive slope for a first range of values of said potential difference, a zero slope for a predetermined value of said potential difference and a negative slope for a second range of values of said potential difference, means for applying said carrier voltage wave between said first control electrode and said point at reference potential in a manner such that said average value of said carrier voltage wave is substantially equal to said predeterminal value of said potential difference, means for applying said second voltage wave between said first control electrode and said point at refernce potential in additive relation to said first voltage wave, and means for deriving an output wave from said tuned circuit.

9. A balanced modulator system according to claim 8 wherein said carrier-voltage producing means comprises a source of a sinusoidal voltage wave having said nominal frequency, said means for producing said second voltage wave comprises a source of a signal having variations according to intelligence, and said inductor and capacitor have respective values such that said tuned circuit is resonant at substantially said nominal frequency.

References Cited in the file of this patent

UNITED STATES PATENTS

| | | |
|---|---|---|
| 2,306,457 | Mayne | Dec. 29, 1942 |
| 2,408,053 | Eyre et al. | Sept. 24, 1946 |
| 2,490,428 | Gluyas | Dec. 6, 1949 |
| 2,504,469 | Tillman | Apr. 18, 1950 |
| 2,600,873 | Holloway | June 17, 1952 |